(12) United States Patent
Han et al.

(10) Patent No.: US 9,577,451 B2
(45) Date of Patent: Feb. 21, 2017

(54) HOLDER FOR PORTABLE ELECTRONIC DEVICE

(71) Applicants: SHENZHEN FUTAIHONG PRECISION INDUSTRY CO., LTD., Shenzhen (CN); FIH (Hong Kong) Limited, Kowloon (HK)

(72) Inventors: Dong Han, Shenzhen (CN); Chih-Wei Chang, New Taipei (TW)

(73) Assignees: SHENZHEN FUTAIHONG PRECISION INDUSTRY CO., LTD., Shenzhen (CN); FIH (Hong Kong) Limited, Kowloon (HK)

( * ) Notice: Subject to any disclaimer, the term of this patent is extended or adjusted under 35 U.S.C. 154(b) by 557 days.

(21) Appl. No.: 14/040,491

(22) Filed: Sep. 27, 2013

(65) Prior Publication Data

US 2014/0333255 A1 Nov. 13, 2014

(30) Foreign Application Priority Data

May 10, 2013 (CN) .......................... 2013 1 0170210

(51) Int. Cl.
*H02J 7/00* (2006.01)
*H02J 7/02* (2016.01)

(52) U.S. Cl.
CPC .............. *H02J 7/0044* (2013.01); *H02J 7/025* (2013.01)

(58) Field of Classification Search
CPC .................................................... H02J 7/0044
USPC .......................................................... 320/108
See application file for complete search history.

(56) References Cited

U.S. PATENT DOCUMENTS

| 6,046,571 A * | 4/2000 | Bovio | G06F 1/1632 320/107 |
|---|---|---|---|
| 6,193,546 B1 * | 2/2001 | Sadler | A45F 5/02 439/165 |
| 7,612,997 B1 * | 11/2009 | Diebel | G06F 1/1632 361/679.41 |
| 8,698,454 B2 * | 4/2014 | Lee | H02J 7/0044 320/107 |
| 2005/0189913 A1 * | 9/2005 | Vitanov | H02J 7/0054 320/114 |
| 2008/0106232 A1 * | 5/2008 | Idzik | H01M 10/44 320/103 |
| 2009/0284216 A1 * | 11/2009 | Bessa | H02J 7/0044 320/101 |
| 2013/0063873 A1 * | 3/2013 | Wodrich | G06F 1/1635 361/679.01 |
| 2013/0278207 A1 * | 10/2013 | Yoo | H02J 7/025 320/108 |
| 2014/0253024 A1 * | 9/2014 | Rautiainen | H02J 7/025 320/108 |

* cited by examiner

*Primary Examiner* — Samuel Berhanu
*Assistant Examiner* — Tessema Kebede
(74) *Attorney, Agent, or Firm* — Zhigang Ma

(57) ABSTRACT

A holder includes a cover, a base, and a charging module. The cover includes a battery, and the base is foldably connected to the cover. The charging module includes a main charging coil and a power supply. The battery and the main charging coil are electrically connected to the power supply. A first proportion of a current from the power supply charges the battery, while a second proportion of the current from the power supply sends current to the main charging coil. The main charging coil charges a portable electronic device received in the holder.

5 Claims, 3 Drawing Sheets

HOLDER FOR PORTABLE ELECTRONIC DEVICE

BACKGROUND

Technical Field

This disclosure relates to holders for portable electronic devices, and particularly to a holder used for charging different portable electronic devices.

Many people carry portable electronic devices, such as tablet computers and mobile phones. When a tablet computer is used to read an eBook or to watch a video, power of the tablet computer is used up quickly. Additionally, mobile phones need to be charged often. However, it is inconvenient to carry two different chargers for the tablet computer and the mobile phone.

Therefore, there is room for improvement within the art.

BRIEF DESCRIPTION OF THE DRAWINGS

Many aspects of the holder can be better understood with reference to the following drawings. The components in the drawings are not necessarily drawn to scale, the emphasis instead being placed upon clearly illustrating the principles of the holder.

DETAILED DESCRIPTION

Figure 1:
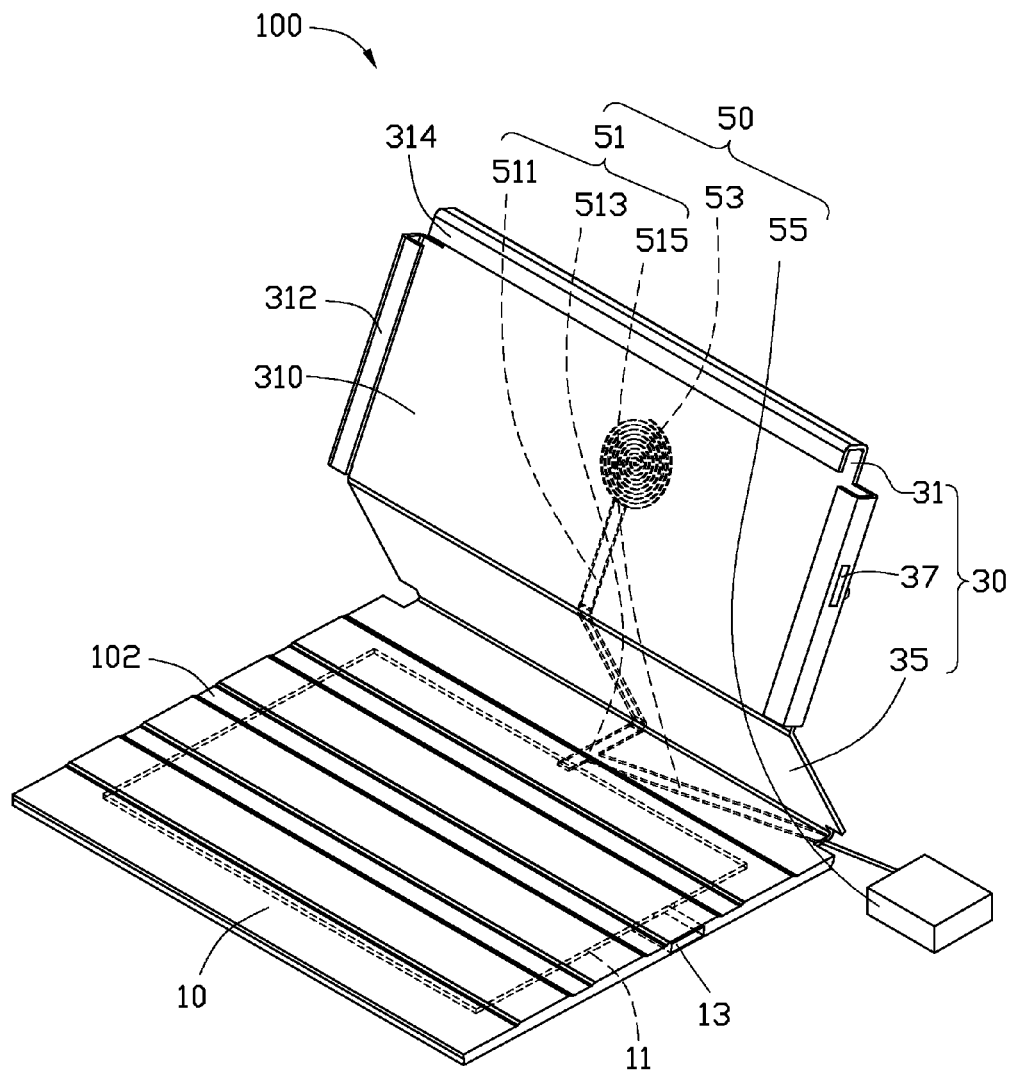
FIG. 1 is a schematic view of a holder, according to an embodiment.
Figure 2:
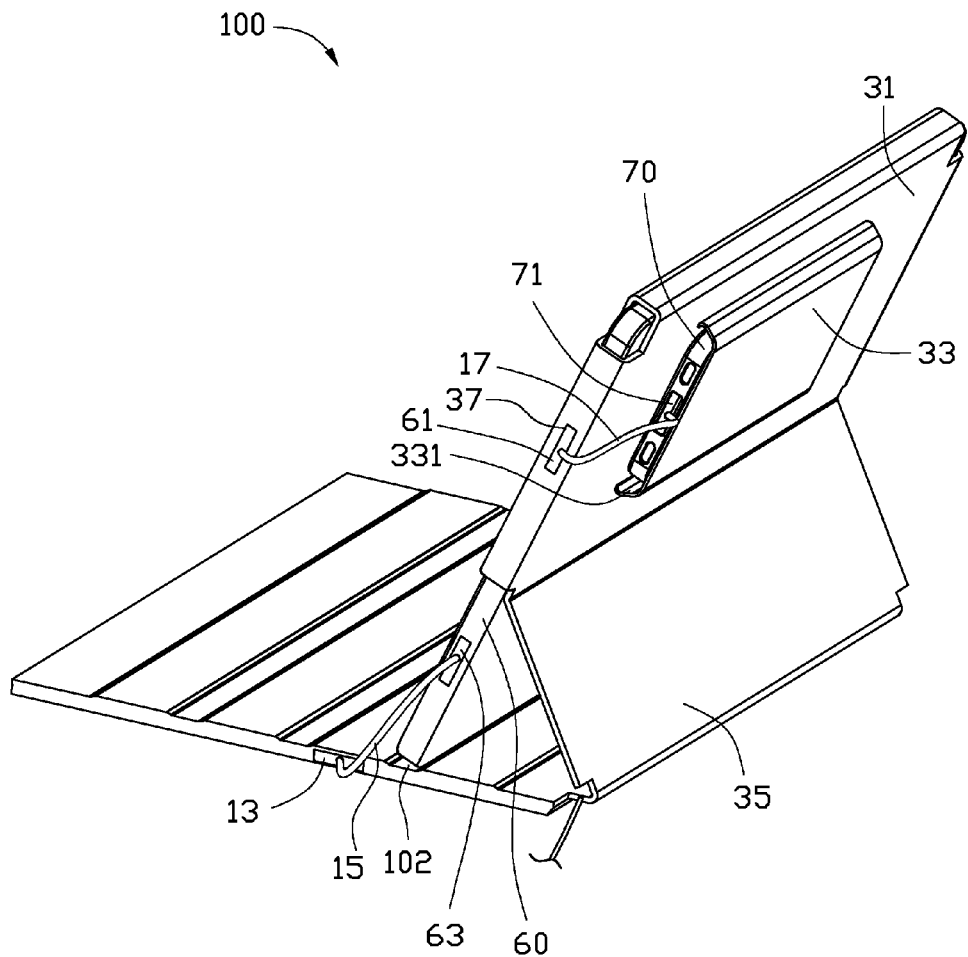
FIG. 2 is a schematic view of the holder of FIG. 1 holding different portable electronic devices.

FIG. 1 shows a holder 100 used for receiving a first portable electronic device 60 and a second portable electronic device 70. In this exemplary embodiment, the first portable electronic device 60 is a tablet computer, and the second portable electronic device 70 is a mobile phone, but the disclosure is not limited thereto.

The holder 100 includes a cover 10, a base 30, and a charging module 50. The base 30 receives the tablet computer 60 and the mobile phone 70. The cover 10 is foldable relative to the base 30 to cover the tablet computer 60. The charging module 50 charges the tablet computer 60 and the mobile phone 70.

The cover 10 defines a plurality of grooves 102 substantially parallel to each other to position the tablet computer 70 received in the base 30 at different angles relative to the cover 10. A battery 11 is received in the cover 10 and has a holder port 13 exposed from the cover 10. The battery 11 charges the tablet computer 60 and the mobile phone 70 through the holder port 13.

The base 30 includes a main plate 31 and a support plate 35 foldable relative to the main plate 31. One surface of the main plate 31 has two first latching walls 312 at opposite sides of the main plate 31, respectively, and a second latching wall 314 between the two first latching walls 312. The first latching walls 312 and the second latching wall 314 cooperatively define a first receiving space 310 on a first surface of the main plate 31. The first receiving space 310 receives one part of the tablet computer 60. One of the first latching walls 312 defines a through hole 37. Another surface of the main plate 31 has a receiving portion 33. A size of the receiving portion 33 corresponds to a size of the mobile phone 70. A second receiving space 331 is defined in the receiving portion 33 for receiving the mobile phone 70.

Opposite sides of the support plate 35 are foldably connected to the main plate 31 and the cover 10, respectively. When the tablet computer 60 needs to be supported at an angle relative to the cover 10, one part of the tablet computer 60 is received in the first receiving space 310, while the other part of the tablet computer 60 is received in one of the grooves 102. The support plate 35 is angled relative to the main plate 31 and the cover 10 for holding the tablet computer 60.

The tablet computer 60 has a first port 61 and a second port 63. The mobile phone 70 has a third port 71. When the tablet computer 60 is received in the first receiving space 310, the through hole 37 is aligned with the first port 61, so that the first port 61 of the tablet computer 60 is exposed from the holder 100. A first wire 15 electrically connects the holder port 13 of the battery 11 to the second port 63 to charge the tablet computer 60. A second wire 17 electrically connects the first port 61 to the third port 71 to transmit the energy of the tablet computer 60 to the mobile phone 70.

Referring to FIG. 1, the charging module 50 includes an arraying cable 51, a main charging coil 53, and a power supply 55. The arraying cable 51 electrically connects the charging coil 53 and the battery 11 to the power supply 55. The arraying cable 51 has a first arraying cable 511, a second arraying cable 513, and a third arraying cable 515. The first arraying cable 511 is connected to the third arraying cable 515 for electrically connecting the main charging coil 53 to the power supply 55. The second arraying cable 513 is connected to the third arraying cable 515 for electrically connecting the battery 11 to the power supply 55.

Figure 3:
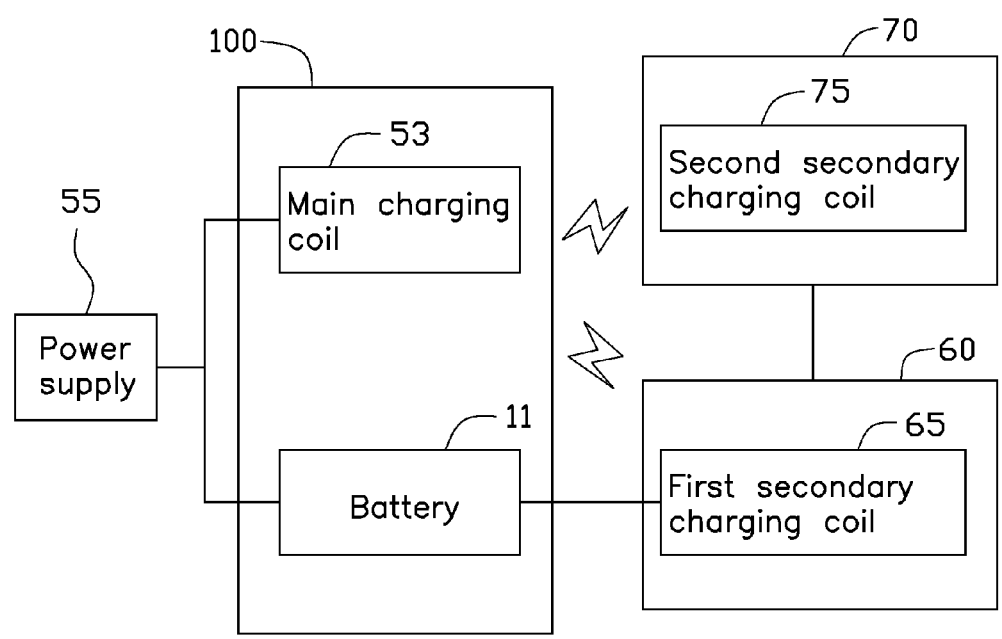
FIG. 3 is a circuit block diagram of the holder of FIG. 2.

Referring to FIG. 3, the tablet computer 60 has a first secondary charging coil 65, and the mobile phone 70 has a second secondary charging coil 75. When the power supply 55 is provided, one first proportion of a current from the power supply 55 is sent to the main charging coil 53, and the current from the main charging coil 53 is coupled to the first secondary charging coil 65 and the second secondary charging coil 75 by electromagnetic coupling for charging the tablet computer 60 and the mobile phone 70, respectively. A second proportion of the current from the power supply 55 charges the battery 11. When the power supply 55 is not used, the tablet computer 60 and the mobile phone 70 are charged by the battery 11 via the first wire 15 and the second wire 17, respectively.

It is to be understood that even though numerous characteristics and advantages of the present exemplary embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A holder comprising:
   a cover comprising a battery with a holder port exposed from the cover;
   a base foldably connected to the cover;
   a charging module comprising a main charging coil and a power supply;
   wherein the battery and the main charging coil are electronically connected to the power supply, a first proportion of the current from the power supply charges the battery, and a second proportion of the current from the power supply is sent to the main charging coil, when the power supply operates, the main charging coil is configured to charge at least one portable electronic device received in the holder; when the power supply does not operate, the battery charges at least one portable electronic device received in the holder through at least one wire electrically connected to the holder port;

wherein the cover defines a plurality of grooves parallel to each other to position the portable electronic device received in the base at different angles relative to the cover;

wherein the base includes a main plate and a support plate foldable relative to the main plate, the main plate defines a first receiving space and a second receiving space on two opposite surfaces for respectively receiving a first portable electronic device and a second portable electronic device;

wherein the holder port of the battery is configured to electrically connect a port of the first portable electronic device received in the first receiving space of the base via a first wire, and is configured to electrically connect a port of the second portable electronic device received in the second receiving space of the base via the first portable electronic device and a second wire.

2. A holder for holding a first portable electronic device and a second portable electronic device, comprising:

a cover comprising a battery with a holder port exposed from the cover;

a base foldably connected to the cover;

a charging module comprising a main charging coil;

wherein the battery charges the first portable electronic device and the second portable electronic device through at least one wire electrically connected to the holder port in a first mode, the main charging coil is configured to charge the first portable electronic device and the second portable electronic device in a second mode;

wherein the cover defines a plurality of grooves parallel to each other to position the portable electronic device received in the base at different angles relative to the cover;

wherein the base includes a main plate and a support plate foldable relative to the main plate, the main plate defines a first receiving space and a second receiving space on two opposite surfaces for respectively receiving a first portable electronic device and a second portable electronic device;

wherein the holder port of the battery is configured to electrically connect a port of the first portable electronic device received in the first receiving space of the base via a first wire, and is configured to electrically connect a port of the second portable electronic device received in the second receiving space of the base via the first portable electronic device and a second wire.

3. The holder as claimed in claim 1, wherein one of the first latching walls defines a through hole, the through hole is aligned with another port of the first portable electronic device, the second wire electrically connects the another port of the first portable electronic device to the port of the second portable electronic device to transmit the energy of the first portable electronic device to the second portable electronic device.

4. The holder as claimed in claim 2, wherein one of the first latching walls defines a through hole, the through hole is aligned with another port of the first portable electronic device, the second wire electrically connects the another port of the first portable electronic device to the port of the second portable electronic device to transmit the energy of the first portable electronic device to the second portable electronic device.

5. A holder comprising:

a cover comprising a battery with a holder port exposed from the cover;

a base foldably connected to the cover;

a charging module comprising a main charging coil and a power supply;

wherein the battery and the main charging coil are electronically connected to the power supply, a first proportion of the current from the power supply charges the battery, and a second proportion of the current from the power supply is sent to the main charging coil, when the power supply operates, the main charging coil is configured to charge at least one portable electronic device received in the holder; when the power supply does not operate, the battery charges at least one portable electronic device received in the holder through at least one wire electrically connected to the holder port;

wherein the charging module further comprising an arraying cable, the arraying cable comprises a first arraying cable, a second arraying cable, and a third arraying cable; the first arraying cable is connected to the third arraying cable for electrically connecting the main charging coil to the power supply; the second arraying cable is connected to the third arraying cable for electrically connecting the battery to the power supply.

* * * * *